(12) United States Patent
DeChristopher et al.

(10) Patent No.: US 9,168,784 B2
(45) Date of Patent: Oct. 27, 2015

(54) SELF-PROPELLED WINDROWER TAILWHEEL NON-ZERO CASTER FOR STABILITY

(71) Applicant: CNH AMERICA, LLC, New Holland, PA (US)

(72) Inventors: David M. DeChristopher, Ephrata, PA (US); Benjamin C. Diem, Mifflintown, PA (US); Todd B. Pierce, East Petersburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 32 days.

(21) Appl. No.: 13/835,482

(22) Filed: Mar. 15, 2013

(65) Prior Publication Data

US 2014/0262559 A1    Sep. 18, 2014

(51) Int. Cl.
*B60B 33/00* (2006.01)
*B60B 33/04* (2006.01)

(52) U.S. Cl.
CPC ......... *B60B 33/0071* (2013.01); *B60B 33/0068* (2013.01); *B60B 33/04* (2013.01)

(58) Field of Classification Search
CPC .. B60B 33/0071; B60B 33/0068; B60B 33/04
USPC .................. 180/6.2, 6.48, 209; 280/124.116, 280/124.166, 124.167, 124.169, 124.133, 280/124.134
See application file for complete search history.

(56) References Cited

U.S. PATENT DOCUMENTS

| | | | |
|---|---|---|---|
| 2,888,840 A | 6/1959 | Witzel | |
| 2,989,829 A | 6/1961 | Heth et al. | |
| 3,266,230 A | 8/1966 | Rowbotham | |
| 3,363,407 A | 1/1968 | Drummond | |
| 3,596,732 A | 8/1971 | Glass et al. | |
| 3,712,403 A | 1/1973 | Pakosh | |
| 5,335,739 A | 8/1994 | Pieterse et al. | |
| 5,664,796 A * | 9/1997 | Huyzers | 280/400 |
| 6,357,793 B1 * | 3/2002 | Dickie et al. | 280/755 |
| 6,523,635 B1 | 2/2003 | Johnston et al. | |
| 6,543,798 B2 * | 4/2003 | Schaffner et al. | 280/250.1 |
| 7,721,830 B2 | 5/2010 | Dunn et al. | |
| 8,020,648 B2 | 9/2011 | Otto | |
| 2010/0230182 A1 * | 9/2010 | Otto | 180/6.48 |

* cited by examiner

*Primary Examiner* — Joseph Rocca
*Assistant Examiner* — Jacob Knutson
(74) *Attorney, Agent, or Firm* — Patrick M. Sheldrake; Seyed V. Sharifi T.

(57) ABSTRACT

A non-zero caster angle for the rear axle swivel caster wheels on a self-propelled agricultural harvesting machine wherein steering is accomplished by varying speed and/or direction of forward drive wheels. The non-zero caster angle may be fixed or an adjuster mechanism may be provided to allow adjustment within a range of caster angles. The adjuster mechanism incorporates a fixed portion connected to the tractor frame and a pair of rotating portions, one connected to each caster wheel which allows rotation of the caster axis in a plane parallel to the machine longitudinal axis. Also disclosed is an actuator mechanism for providing powered adjustment of the caster angle, even including a control system for active caster angle adjustment.

11 Claims, 5 Drawing Sheets

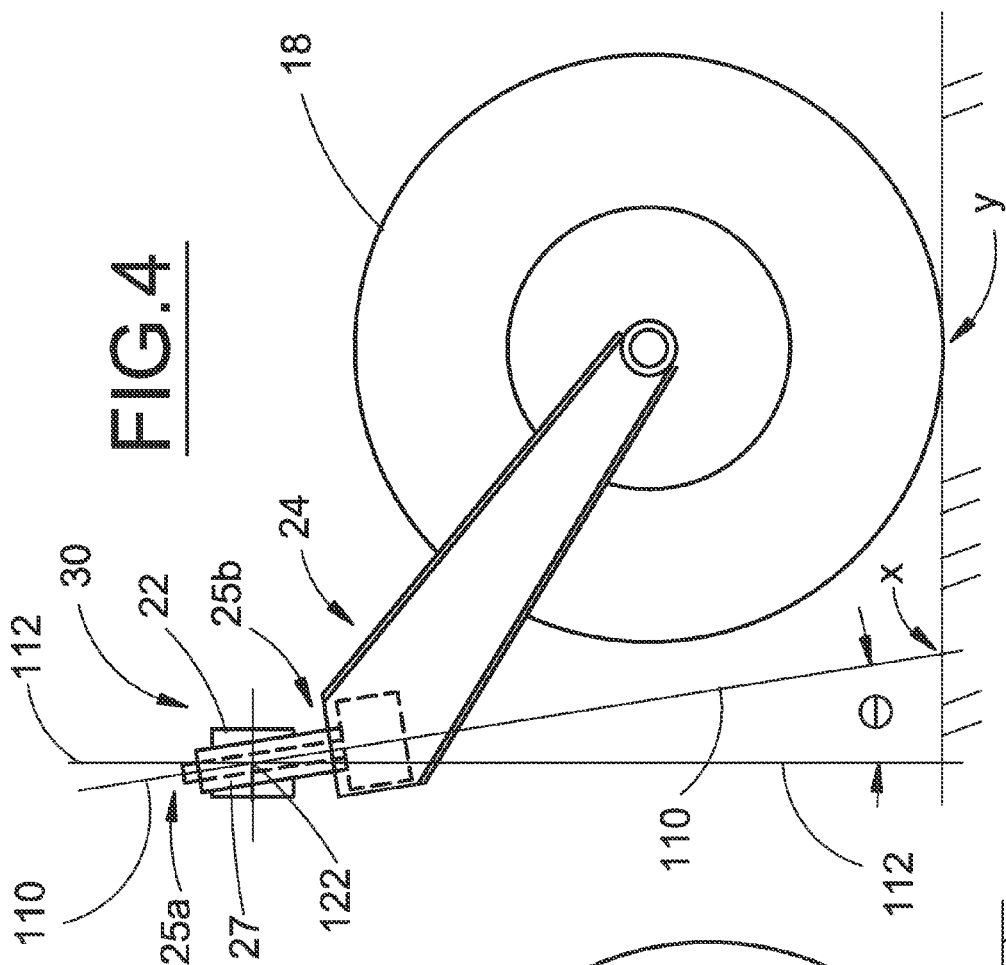
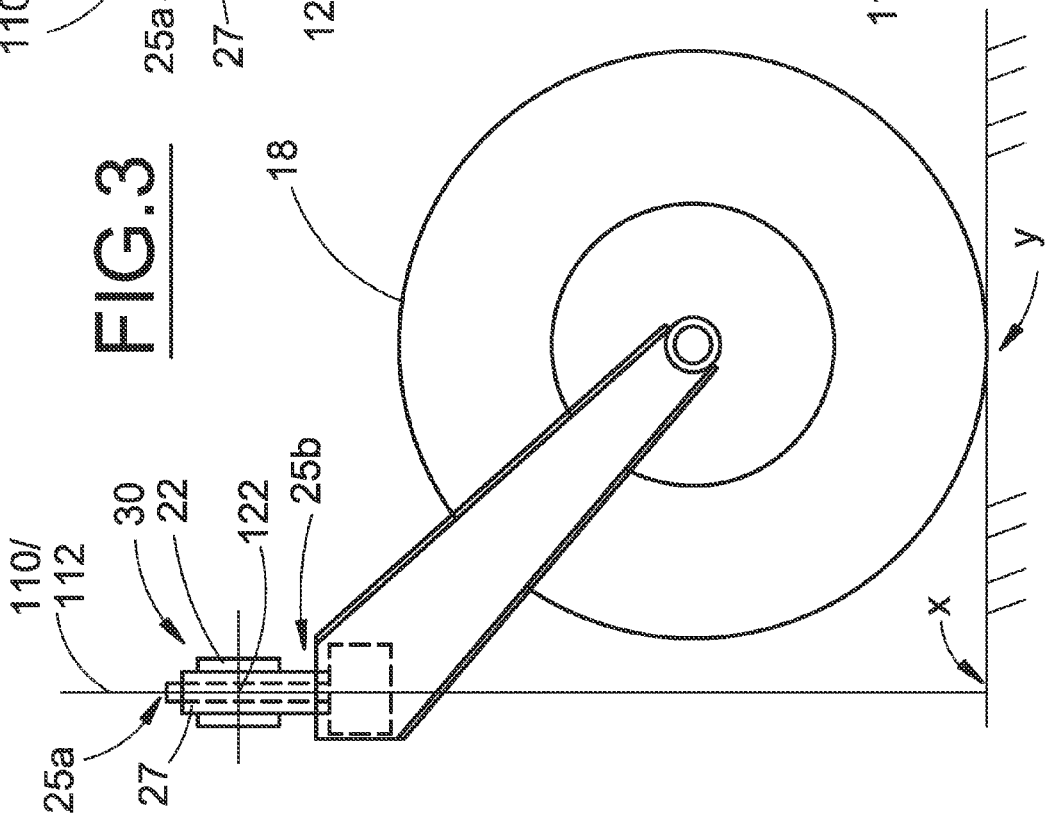

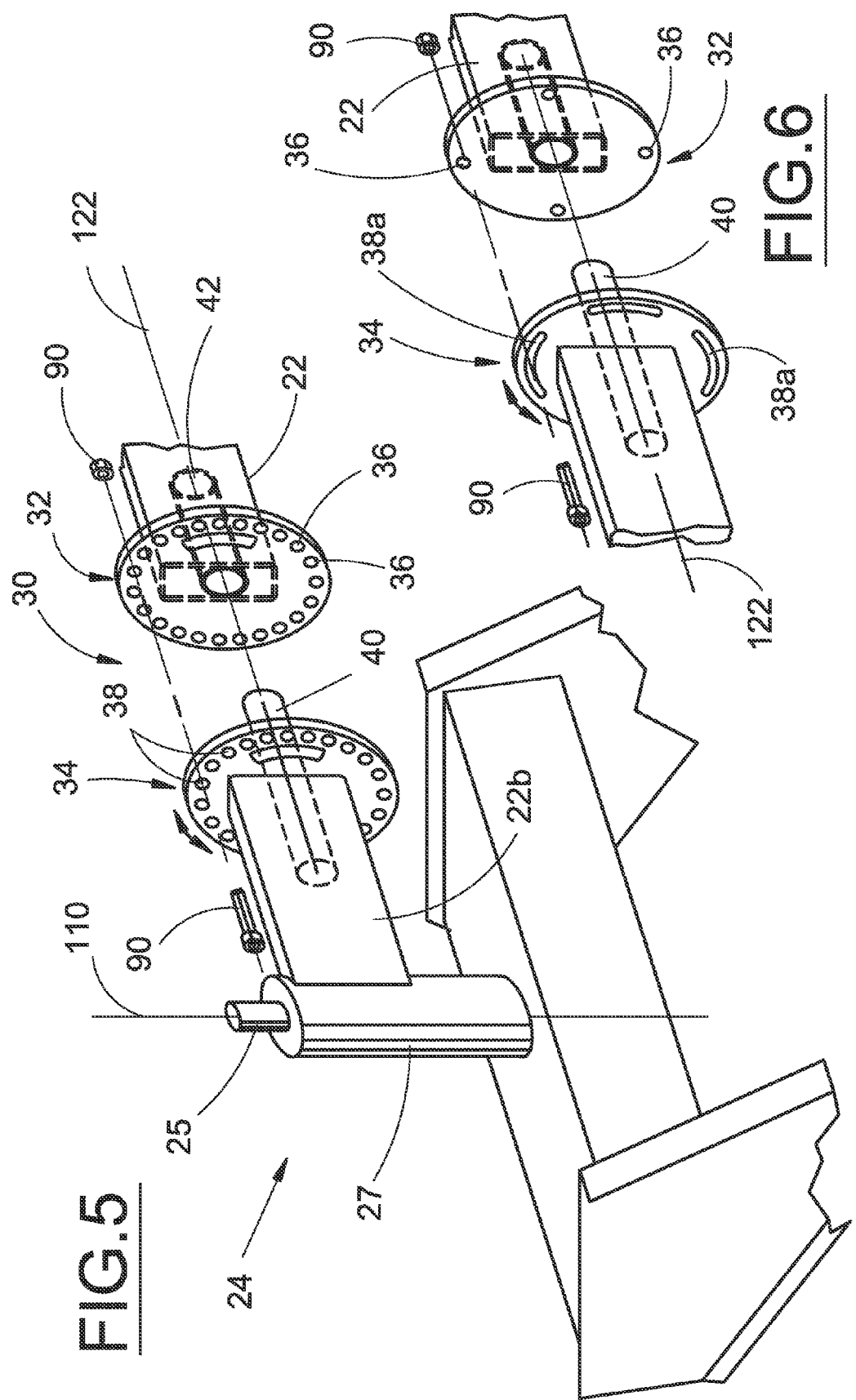

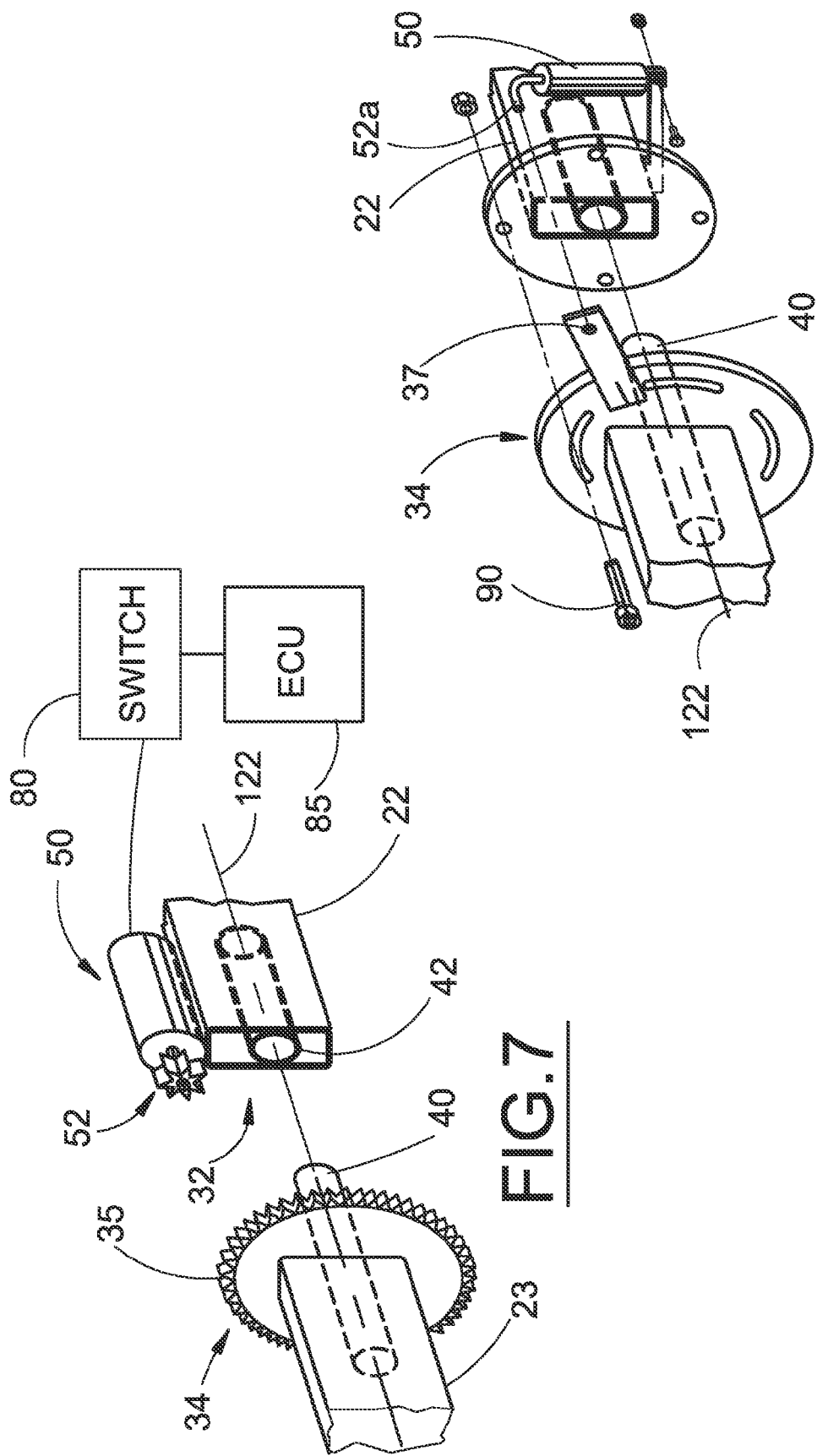

SELF-PROPELLED WINDROWER TAILWHEEL NON-ZERO CASTER FOR STABILITY

BACKGROUND OF THE INVENTION

This invention relates to a caster adjustment arrangement for a hydraulically driven tractor of the type which is supported on a pair of hydraulically driven wheels and a pair of caster wheels and steered by a differential speed between the driven wheels.

Self-propelled windrowers require precise and quick control for field operation at low speeds. Maneuverability is enhanced through the use of a zero caster angle, that is, the pivot axis for the caster wheels is vertical with respect to the machine. A zero caster angle reduces the torque differential required from the drive wheels to steer the tractor by reducing the tendency of the caster wheels to self-steer to a neutral position (self-center). When transporting at higher speeds, quick directional control and lack of self-centering can result unstable directional operation, especially for novice users. Unstable operation can lead to accidents and/or the inability of an inexperienced user the reach full transport speed of the unit.

It would be advantageous to have an adjustment means for altering the caster angle of the caster wheels to an optimal angular position that balances operational maneuverability and transport stability. Further advantages would be realized by a caster angle adjustment that can be easily incorporated into current windrower tractor designs or even retrofit onto existing machines. Still further advantages would be realized by an adjustment means for altering the caster angle of the caster wheels of a windrower tractor that is adaptable for manual, powered, or automatic adjustment.

SUMMARY OF THE INVENTION

Accordingly, the present invention, in any of the embodiments described herein, may provide one or more of the following advantages:

It is an object of the present invention to provide a swivel caster wheel assembly for the rear axle on a self-propelled windrower tractor or the like in which the rear wheel caster angle is non-zero.

It is a further object of the present invention to provide an adjustment mechanism for the rear axle on a self-propelled windrower tractor or the like that enables a range of rear wheel caster angles to be selected to enable selection of a caster angle to suit operational conditions.

It is a further object of the present invention to provide a caster adjuster for the rear axle on a self-propelled windrower tractor or the like that can be configured for manual adjustment, automatic adjusting using a control system, or a manually selected power adjustment.

It is a still further object of the present invention to provide a non-zero caster angle for the wheel swivel caster assemblies on the rear axle on a self-propelled windrower tractor or the like that will function with center-pivoting axles or suspended axles. The non-zero caster angle may be fixed or adjustable by an included adjusting mechanism.

It is a still further object of the present invention to provide a caster adjuster for the rear axle on a self-propelled windrower tractor or the like that is durable in construction, inexpensive of manufacture, carefree of maintenance, easily assembled, and simple and effective to use.

These and other objects are achieved in accordance with the instant invention by providing a non-zero caster angle for the rear axle swivel caster wheel assemblies on a self-propelled agricultural harvesting machine wherein machine steering is accomplished by varying speed and/or direction of forward drive wheels. The non-zero caster angle may be fixed or an adjuster mechanism may be provided to allow adjustment within a range of caster angles. The adjuster mechanism incorporates a fixed portion connected to the tractor frame and a pair of rotating portions, one connected to each caster wheel which allows rotation of the caster axis in a plane parallel to the machine longitudinal axis. Provisions in the fixed and rotating portions allow the portions to be secured to prevent pivoting in a plurality of selectable positions and to limit the degree of pivoting of the caster adjuster. An actuator mechanism may also be provided for powered adjustment of the caster angle, even including a control system for active caster angle adjustment.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a partial side elevation view of a rear wheel assembly from the windrower tractor shown in FIGS. 1 and 2 wherein the caster angle is set to a zero position;

FIG. 4 is a partial side elevation view of the rear wheel assembly shown in FIG. 3 wherein the caster angle has been set to non-zero in accordance with the present invention;

FIG. 5 is a partial perspective view of a first embodiment of the present invention illustrating a manually altered caster angle adjuster mechanism;

FIG. 6 is a partial perspective view of a second embodiment of a manually altered caster angle adjuster mechanism;

FIG. 7 is a partial perspective view of a third embodiment of the present invention illustrating a power-operated caster angle adjuster mechanism; and FIG. 8 is a partial perspective view of a fourth embodiment of a power-operated caster angle adjuster mechanism.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
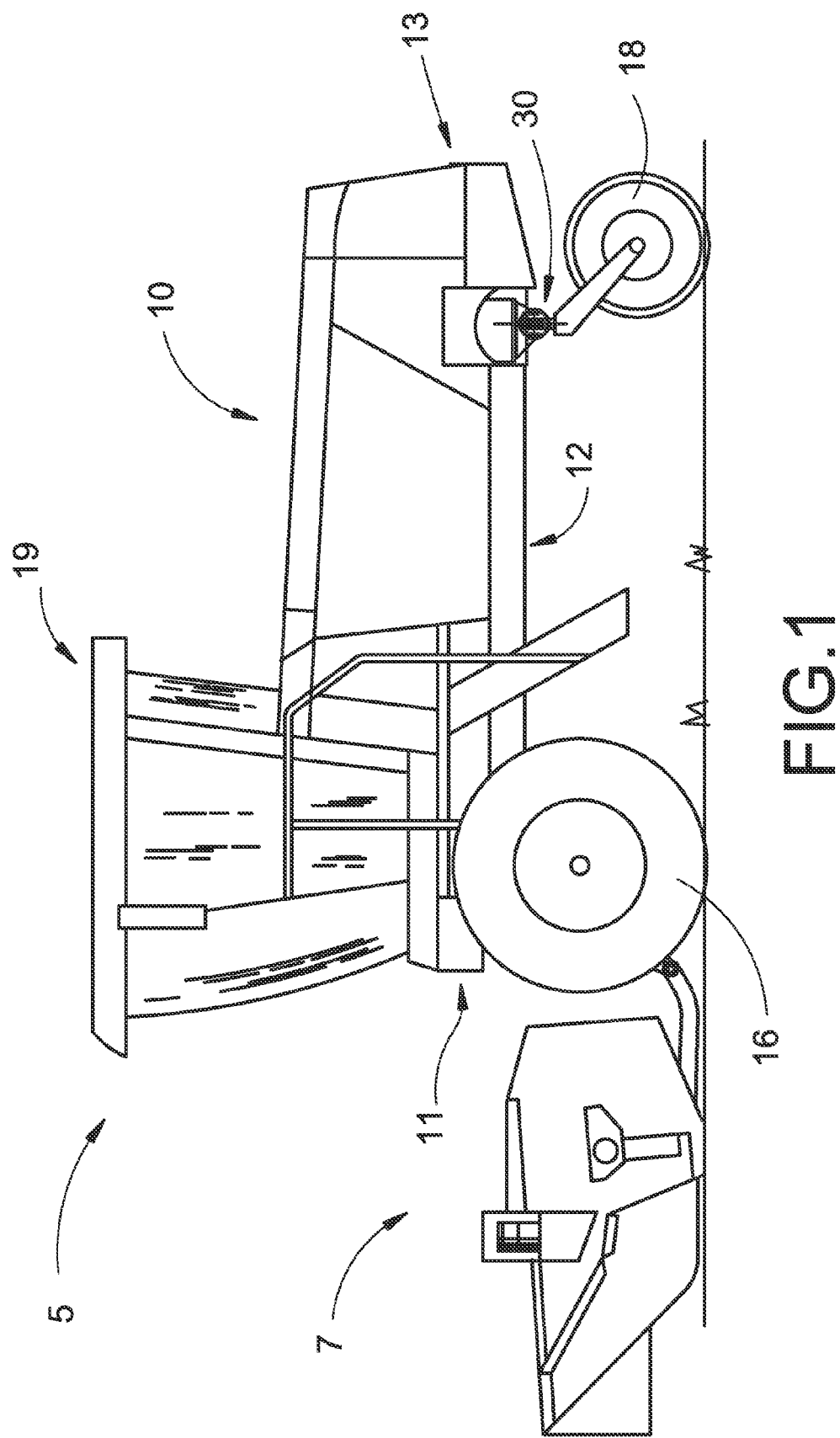
FIG. 1 is a left side elevation view of an agricultural self-propelled windrower of the type on which the present invention is useful.
Figure 2:
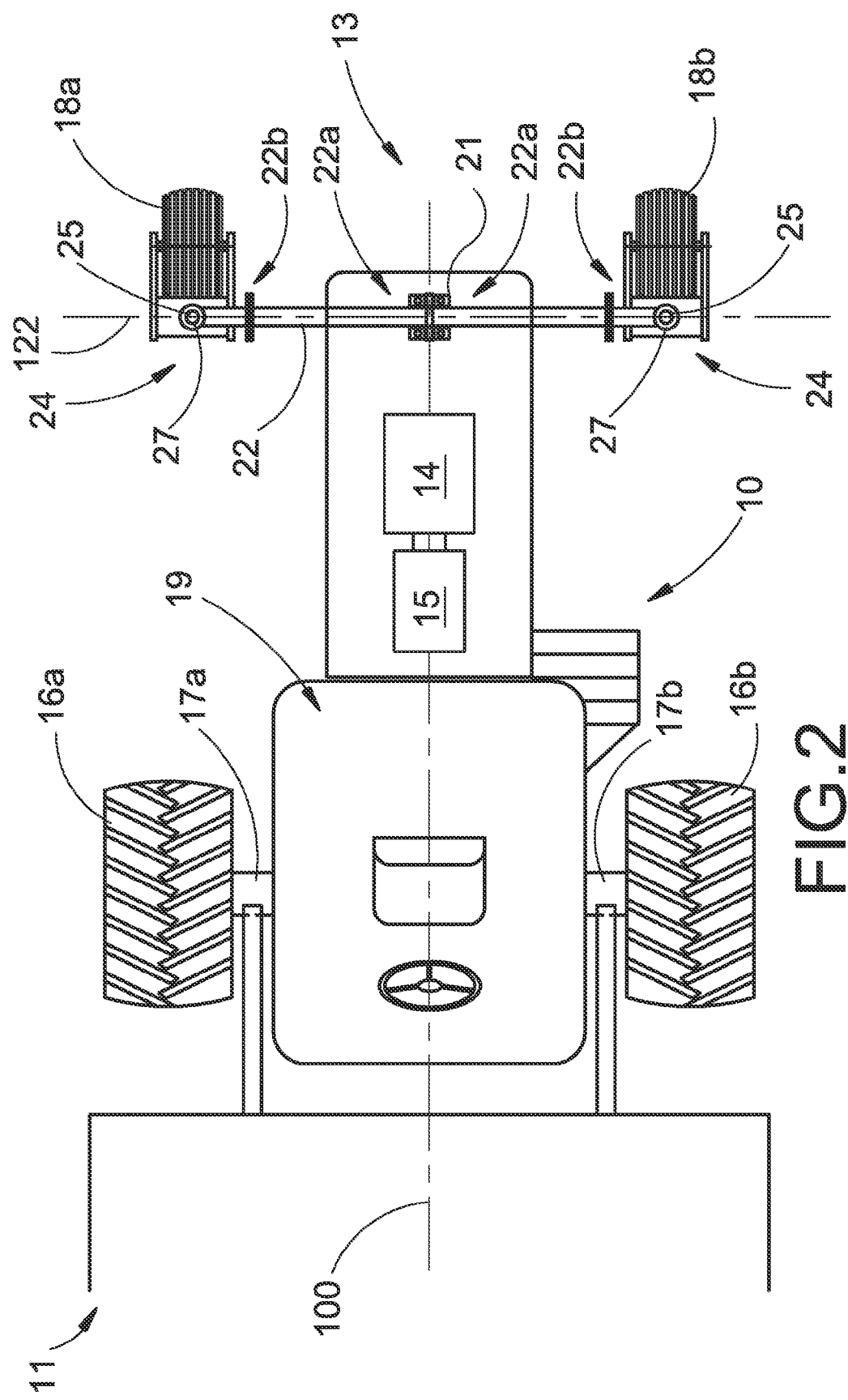
FIG. 2 is a partial plan view of the self-propelled windrower shown in FIG. 1.

In FIGS. 1 and 2, a self-propelled agricultural windrower 5 is shown including a having a tractor 10 having a main frame 12 with a forward end 11 and a rearward end 13 defining a longitudinal axis 100 therebetween. Main frame 12 is supported by a right and left front wheels 16a, 16b and right and left rear wheels 18a, 18b. The main frame supports an operator cab from which machine operation is controlled, an engine 14, and drive train typically comprising a hydraulic pump 15 and a pair of hydraulic motors 17a, 17b operably connected to the front wheels for propelling the tractor and capable of driving the front wheels independently to allow differential speeds and or directions of rotation from side to side. A crop engaging header 7 is forwardly supported by the main frame.

A transverse beam 22 extending along a transverse axis 122 is provided at the rear of the frame with the rear wheels 18a, 18b mounted on the distal ends 22b away from the longitudinal axis 110. At each distal end 22b of the axle beam is a rear wheel mount including a caster assembly 24 having an upstanding pivot member 25 engaged in a swivel support 27 which allows the respective rear wheels 18 to pivot about a generally upstanding swivel axis 110 allowing the tractor to be steered by differential speeds of the front wheels. While illustrated as a continuous beam having a central pivot connection 21 to the main frame 12, the rear wheel support beam may include respective laterally extending right and left beam portions having proximal ends 22a connected to the main frame by a pivot connections 21, and extending along the transverse axis 122 toward distal ends 22b, such as is provided in an independent suspension arrangement. As used herein, the term beam portion refers to the portion of the rear axle beam extending laterally away from the main frame connection point, regardless of whether the machine uses a single pivot-mounted beam axle or an independent axle beam arrangement. It is also common for the beam portions to include provision to adjust the length thereof so that the machine track width may be adjusted to suit field conditions or limitations. Such track adjustment provisions are also contemplated within the meaning of the term axle beam portion.

It is common for tractor maneuverability to be enhanced by orienting the swivel axis 110 vertically (as shown in FIG. 3), referred to as a zero caster angle. Use of a vertical caster angle on self-propelled agricultural windrowers is well-known as a vertical caster angle minimizes the torque differential required from the front drive wheels to steer the tractor at a slight expense of tractor directional stability at increased tractor speed. Increasing the caster angle (rotation of the swivel axis in a vertical plane parallel to the tractor longitudinal axis 100) to a non-zero angle so that an upper end 25a of the pivot member 25 is forward of, in relation to the forward direction of travel, the lower end 25b of the pivot member improves steering stability of the tractor at higher speed with only slight impact on low speed maneuverability. FIG. 4 illustrates the caster assembly 24 orientation when adjusted to a positive caster angle $\Theta$. Increasing the caster angle causes the wheel swivel to self-center in the straight ahead direction since the high-trail (distance between a point at which the swivel axis intersects the ground, point "X" and the contact point of the wheel on the ground, point "Y.") caster assembly will elevate the swivel support 27 as the wheels are turned away from a straight-ahead alignment creating a small centering torque. At lower tractor speeds, the centering torque is easily overcome by the drive train, so the effect on vehicle maneuverability is minimal. As tractor speed increases, drive train differential torque between the individual front wheel motors is lower, so the centering torque of the rear wheels is not so easily overcome by the drivetrain which, in turn, enhances tractor stability at higher travel speeds. As an added advantage, the tendency of the rearward end of the tractor to sag when moving in the reverse direction due to effective shortening of the wheelbase and proportional increase of the vehicle weight supported by the rear axle is offset as the caster assembly will slightly elevate the rear axle beam when the rear wheels are swiveled 180 degrees from the normal, forward direction.

In a first embodiment, best illustrated in FIG. 4, a non-zero caster angle $\Theta$ is established for the swivel axis 110 in relation to a generally vertical axis 112, generally by fixing the swivel support 27 in a position rotated about the transverse axis 122 so that it is no longer vertical (perpendicular to a horizontal plane defined by the tractor longitudinal axis 100). The rotated positioning of swivel support 27 needed to move the swivel axis 110 to a non-zero position may be accomplished at the connection between the swivel support 27 and the axle beam 22, by rotating the entire axle beam assembly about transverse axis 122 relative to the tractor, or by incorporating an assembly joint in the axle beam that allows the angled orientation. Testing has shown that a positive caster angle $\Theta$ of between 7 and 9 degrees performs well at travel speeds to approximately 23 miles per hour (37 kilometers per hour). At higher speeds, approaching 25.5 miles per hour (41 kilometers per hour), increasing the caster angle to as much as a caster angle $\Theta$ of 12 degrees provides better steering stability, albeit at the expense of low-speed maneuverability. As caster angle exceeds a fixed caster angle of 15 degrees, the self-centering effect of the caster angle begins to overpower the ability of the drive wheels to effectively steer the tractor.

Embodiments in which caster angle is adjustable by a machine operator, discussed hereinafter, increasing the caster angle to as much as 20 degrees improves steering stability during high speed, straight ahead over-the-road transport of the machine when steering stability is favored over maneuverability. A control system may be provided for actively managing caster angle based on machine travel speed and directional control input. For example, a large caster angle would be set as machine travel speed exceeds a pre-determined value and the steering input is generally straight-ahead. The control system would then reduce the caster angle slightly when the machine operator initiates steering input for a turn or slows the machine. The control system could also include multiple modes for operations or transport to define caster angle ranges optimized for the varying conditions, especially during harvesting operations when maximum maneuverability might be is preferred and transport when high speed steering stability might be preferred.

Referring to FIGS. 5 through 8 in conjunction FIGS. 1 through 4, alternate embodiments of a caster adjuster mechanism 30 are shown for enabling a non-zero caster angle to be selected by a tractor user. In a first embodiment shown in FIG. 5, a caster adjuster mechanism 30 is mounted in the transverse axle beam 22 between inward connection to the tractor 21 and each rear wheel 18. Each adjuster mechanism 30 comprises a fixed adjuster portion 32, a movable adjuster portion 34, and a rotation mechanism 40. The fixed and movable adjuster portions 32, 34 are flanges having generally planar mating surfaces. The fixed adjuster portion is connected to an end of the axle beam 22 while the movable adjuster portion is connected to the swivel support 27 of the caster assembly 24 or an extension of the axle beam 22. The rotation mechanism is an axle or spindle 40 that engages one or more sleeves 42 disposed on either side of the adjuster mechanism joint that allows the adjuster portions 32, 34 to rotate in relation to one another about an axis generally co-extensive with the axle beam 22 transverse axis 122. The arrangement maintains alignment of the axle as the caster angle is adjusted. The spindle may also be fixed to one of the adjuster portions 32, 34 and engage a bearing or sleeve in the opposing adjuster portion.

A plurality of alignment holes 36, 38 in the adjuster portions 32, 34 allow the adjuster portions to be secured in a fixed position corresponding to a desired caster angle by aligning a hole 36 on the fixed adjuster portion 32 with a hole 38 on the movable adjuster portion 34 that results in the desired caster angle and securing the adapter portions by bolting 90 or similar fastening means. The plurality of alignment holes 36, 38 are radially arranged on each adapter portion, all having centers positioned the equidistantly from the centerline axis 122. The number and spacing of the alignment holes 36, 38 may be configured to provide alignments for a range of pre-determined optimal caster angle settings.

It is preferable to provide adjustments for a range of caster angles generally spanning between zero and to as much as approximately 20 degrees. Though possible, there is no benefit to providing adjustment to allow negative caster angles. A skilled artisan will recognize that there are numerous combinations of fixed and movable adjuster portions and structural configurations thereof that will accomplish the same result; such alternate embodiments are envisioned within the scope and spirit of the present invention.

In another alternate embodiment, shown in FIG. 6, some alignment holes 38 may be in the form of elongated, arcuate slots 38a which allow the caster angle to be fixed within a pre-determined range of caster angles, but not limited to a finite number of settings within the range.

A passive, manually adjustable adjuster mechanism is preferred for its simplicity, lacking the need for any machine operator input or complex controls. The system is inexpensive, requiring only welding of the adjuster mechanism portions into existing axle beam parts. Convenience can be enhanced by a power-operated adjuster mechanism, such as the embodiment illustrated in FIGS. 7 and 8. In these embodiments, an actuator 50 is provided, preferably fixedly mounted on the axle beam 22 to function as the fixed actuator portion 32. An output element 52, such as a gear shown in FIG. 7, provided on the actuator engages a driven gear 35 on the moveable portion 34.

An actuator switch 80 provided in the tractor cab allows an operator to selectively power the actuator in one of two opposing directions allowing convenient adjustment of the caster angle to suit operating conditions. Additional operator convenience may be added by incorporation of a controller 85 that automatically operates actuator 50 to adjust caster angle based on selection of a harvesting or transport mode, or even based on tractor travel speed.

As shown in FIG. 8, the output element is arranged to act upon a linkage 37 to cause rotation of the movable adjuster portion 34. It is also contemplated that a powered caster adjuster mechanism would also benefit from the ability to fix the caster angle in position by means other than the actuator 50; to this end, a fastening arrangement similar to the manually adjusted mechanism of FIGS. 5 and 6 may also be provided. Other mechanisms capable of rotating the movable adjuster precisely and retaining the movable portion in a fixed position are also considered, including cam and follower and linkages interconnecting both sides so that a single actuator adjusts the caster angle of both rear wheels simultaneously.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A self-propelled agricultural crop harvesting machine comprising:
    a main frame extending along a longitudinal axis between front and opposing rear ends and adapted to support a removable crop-engaging header on said front end thereof;
    a transversely spaced-apart front wheel pair supporting the front end of the main frame;
    an engine and drive system supported by said main frame to supply motive power to drive said front wheel pair at independently adjustable rates, differences thereof enabling control of direction of travel of the harvesting machine;
    laterally extending elongate beam portions connected to the main frame at a position spaced longitudinally from the front wheel pair, each having a distal end;
    a rear wheel pair supporting the rear end of the main frame, one of the rear wheel pair mounted on one of the respective distal ends of the beam by a caster assembly, each caster assembly having a pivot member defining a generally upstanding swivel axis mounted in a swivel support; and
    a caster angle adjuster assembly connected to each of the laterally extending beam portions, each assembly having a fixed adjuster portion disposed toward a proximal end of the laterally extending beam portions and a moveable portion disposed toward the distal end of the laterally extending beam portions, the movable adjuster portion rotatable about the longitudinal axis of the beam portion enabling rotation of the angle of orientation of the swivel axis at least in a plane parallel to the longitudinal axis to a position angled from vertical; and
    wherein each caster angle adjuster mechanism further comprises an indexing structure wherein the fixed and movable adjuster portions may be selectively fixed in one of a plurality of angular positions corresponding to an angular displacement of the swivel axis from vertical.

2. The crop harvesting machine of claim 1, wherein the indexing structure is a first plurality of apertures in the fixed adjuster portion and a second plurality of apertures in the moveable adjuster portion arranged to permit selection of one of a plurality of pre-determined caster angles.

3. A self-propelled agricultural crop harvesting machine comprising:
    a main frame extending along a longitudinal axis between front and opposing rear ends and adapted to support a removable crop-engaging header on said front end thereof;
    a transversely spaced-apart front wheel pair supporting the front end of the main frame;
    an engine and drive system supported by said main frame to supply motive power to drive said front wheel pairs at independently adjustable rates, differences thereof enabling control of direction of travel of the harvesting machine;

laterally extending elongate beam portions connected to the main frame at a position spaced longitudinally from the front wheel pair, each having a distal end;

a rear wheel pair supporting the rear end of the main frame, one of the rear wheel pair mounted on one of the respective distal ends of the beam by a caster assembly, each caster assembly having a pivot member defining a generally upstanding swivel axis mounted in a swivel support; and a caster angle adjuster assembly disposed in each of the laterally extending beam portions, each assembly having a fixed adjuster portion disposed toward a proximal end of the laterally extending beams portions and a moveable portion disposed toward the distal end of the laterally extending beams portions, the movable adjuster portion rotatable about the longitudinal axis of the beam portion enabling rotation of the swivel axis in a plane parallel to the longitudinal axis to a position angled from vertical; and wherein each caster angle adjuster mechanism further comprises an indexing structure wherein the fixed and movable adjuster portions may be selectively fixed in one of a plurality of angular positions corresponding to an angular displacement of the swivel axis from vertical.

4. The crop harvesting machine of claim 3, wherein the indexing structure is a first plurality of apertures in the fixed adjuster portion and a second plurality of apertures in the moveable adjuster portion arranged to permit selection of a caster angle from within a range of pre-determined caster angles.

5. The crop harvesting machine of claim 4, wherein said range of pre-determined caster angles ranges between values greater than zero and less than or equal to twenty degrees from vertical in a direction inclining said swivel axis upper forwardly and lower rearwardly with respect to the longitudinal axis.

6. The crop harvesting machine of claim 5, further comprising an actuator operable between opposing first and second positions, the actuator fixedly connected in relation to the fixed adjuster portion and having an output structure engaging the movable adjuster portion, operation of the actuator between said first and second positions causing angular rotation of the moveable adjuster portion and changes in the angle of the swivel axis.

7. A self-propelled agricultural crop harvesting machine Comprising:

a main frame extending along a longitudinal axis between front and opposing rear ends and adapted to support a removable crop-engaging header on said front end thereof;

first and second transversely spaced-apart drive wheels supporting the front end of the main frame;

an engine and drive system supported by the main frame to supply motive power to drive the first and second drive wheels at independently adjustable rates, differences thereof enabling control of direction of travel of the harvesting machine;

first and second non-driven caster wheels supporting the rear end of the main frame, the first and second caster wheels mounted on respective caster assemblies, each caster assembly having a pivot member mounted in a swivel support member defining a swivel axis, the swivel axis being angled from a vertical axis in a plane parallel to the longitudinal axis;

laterally extending elongate beam portions connected to the main frame, each having a proximal end connected to the main frame and a distal end connected to a respective caster assembly; and a pair of caster angle adjuster assemblies, one disposed in each of the laterally extending beam portions, each assembly having a fixed adjuster portion disposed toward the proximal end and a moveable portion disposed toward the distal end, the movable adjuster portion rotatable about the longitudinal axis of the beam portion enabling rotation of the swivel axis in the plane parallel to the longitudinal axis to a position angled from vertical wherein each caster angle adjuster assembly has an indexing structure such that the fixed and movable adjuster portions may be selectively fixed in one of plurality of angular positions corresponding to an angular displacement of the swivel axis from vertical.

8. The crop harvesting machine of claim 7, wherein the swivel axis angle is greater than zero degrees from vertical in a direction inclining the swivel axis upper forwardly and lower rearwardly with respect to the longitudinal axis.

9. The crop harvesting machine of claim 8, wherein said swivel axis angle ranges between greater than zero degrees and twenty degrees.

10. The crop harvesting machine of claim 7, wherein the indexing structure is a first plurality of apertures in the fixed adjuster portion and a second plurality of apertures in the moveable adjuster portion arranged to permit selection of one of a plurality of pre-determined caster angles.

11. The crop harvesting machine of claim 7, further comprising an actuator operable between opposing first and second positions, the actuator fixedly connected in relation to the fixed adjuster portion and having an output structure engaging the movable adjuster portion, operation of the actuator between said first and second positions causing angular rotation of the moveable adjuster portion and changes in the angle of the swivel axis.

* * * * *